(12) United States Patent
Soulier et al.

(10) Patent No.: US 8,573,928 B2
(45) Date of Patent: Nov. 5, 2013

(54) COUPLING DEVICE INTENDED TO CONNECT FIRST AND SECOND ELEMENTS WHICH CAN MOVE RELATIVE TO ONE ANOTHER

(75) Inventors: Pascal-Marie Paul Marcel Soulier, Le Havre (FR); Aurelie De Sorbay, Le Havre (FR)

(73) Assignee: Aircelle, Gonfreville l'Orcher (FR)

( * ) Notice: Subject to any disclaimer, the term of this patent is extended or adjusted under 35 U.S.C. 154(b) by 930 days.

(21) Appl. No.: 12/673,989

(22) PCT Filed: Jul. 28, 2008

(86) PCT No.: PCT/EP2008/059849
§ 371 (c)(1),
(2), (4) Date: Feb. 18, 2010

(87) PCT Pub. No.: WO2009/024431
PCT Pub. Date: Feb. 26, 2009

(65) Prior Publication Data
US 2011/0038725 A1    Feb. 17, 2011

(30) Foreign Application Priority Data
Aug. 20, 2007   (FR) .................................... 07 05930

(51) Int. Cl.
*F01D 25/24* (2006.01)
(52) U.S. Cl.
USPC ...................... 415/126; 415/213.1; 415/214.1
(58) Field of Classification Search
USPC .................................... 415/126, 213.1, 214.1
See application file for complete search history.

(56) References Cited

U.S. PATENT DOCUMENTS

| | | | |
|---|---|---|---|
| 4,585,189 A | | 4/1986 | Buxton |
| 4,629,146 A | * | 12/1986 | Lymons ...................... 244/53 R |
| 4,825,648 A | * | 5/1989 | Adamson ..................... 60/226.1 |
| 6,227,485 B1 | * | 5/2001 | Porte .............................. 244/54 |
| 6,869,046 B2 | * | 3/2005 | McEvoy .......................... 244/54 |
| 2008/0129056 A1 | * | 6/2008 | Hernandez et al. ............. 292/98 |

FOREIGN PATENT DOCUMENTS

| | | |
|---|---|---|
| EP | 0155887 A1 | 9/1985 |
| EP | 1167186 A1 | 1/2002 |
| EP | 1245769 A2 | 10/2002 |

(Continued)

OTHER PUBLICATIONS

International Search Report PCT/EP2008/059849; Dated Nov. 18, 2008.

*Primary Examiner* — Ninh H Nguyen
(74) *Attorney, Agent, or Firm* — Brinks Hofer Gilson & Lione

(57) ABSTRACT

The invention relates to a coupling device (14) intended to connect first and second elements (4, 5) which can move relative to one another, comprising a connecting rod (16) coupled to the first and second movable elements (4, 5) at first and second ends (18, 19) respectively, at least one of the ends of the connecting rod (16) having a head (22) intended to cooperate with locking means (23) belonging to the corresponding movable element (5) so as to removably fasten the connecting rod (16) to the corresponding movable element (5), characterized in that the coupling device (14, 15) comprises at least one telescopic guide member (25) serving to support and guide the connecting rod (16) during the movement of the movable elements (4, 5), having first and second ends (28, 26) intended to be attached to first and second support elements (23, 16) respectively.

11 Claims, 7 Drawing Sheets

(56) References Cited

FOREIGN PATENT DOCUMENTS

| EP | 1336707 | A1 | 8/2003 |
| EP | 1927711 | A2 | 6/2008 |
| FR | 2622930 | A1 | 5/1989 |

* cited by examiner

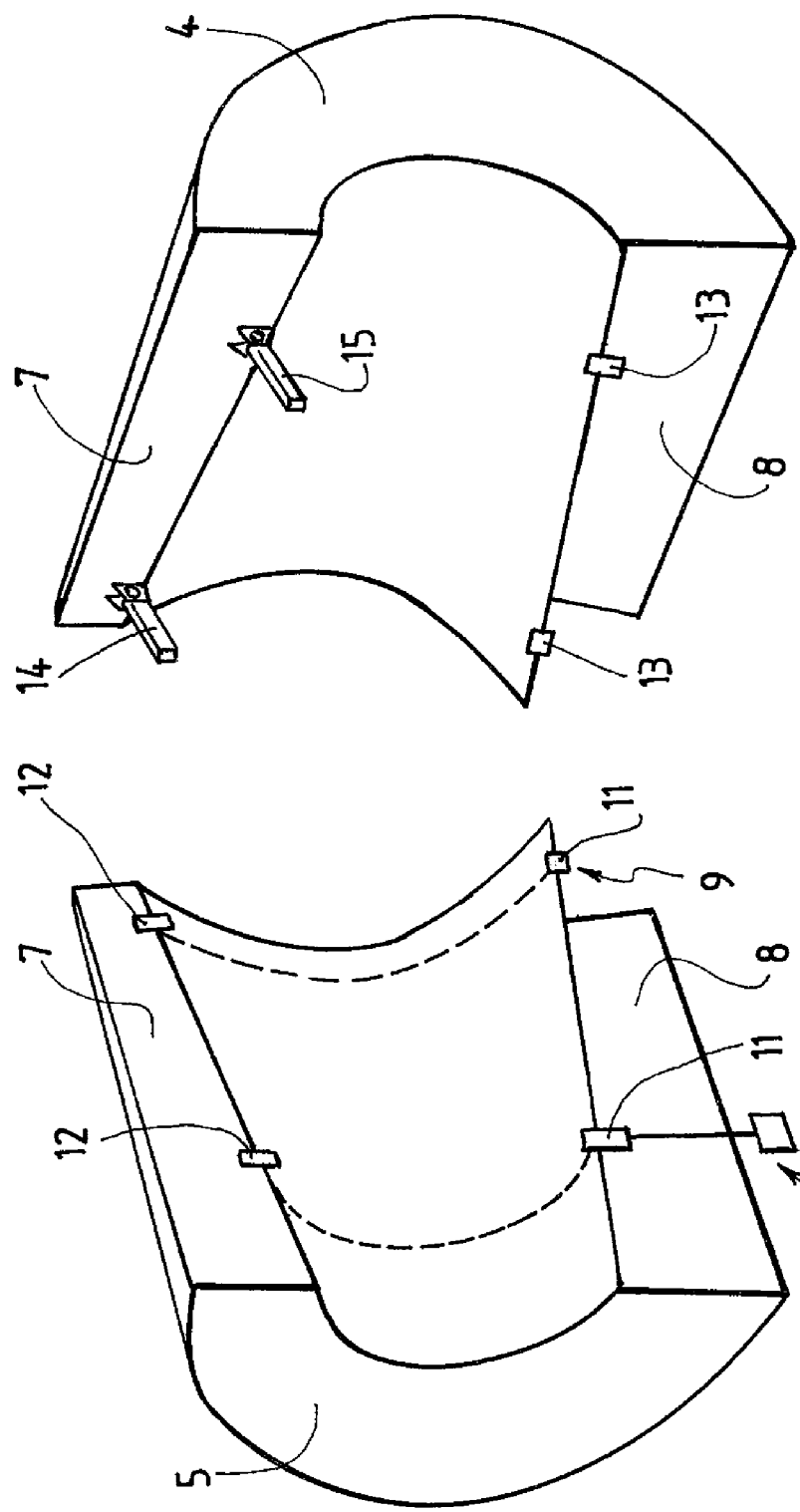

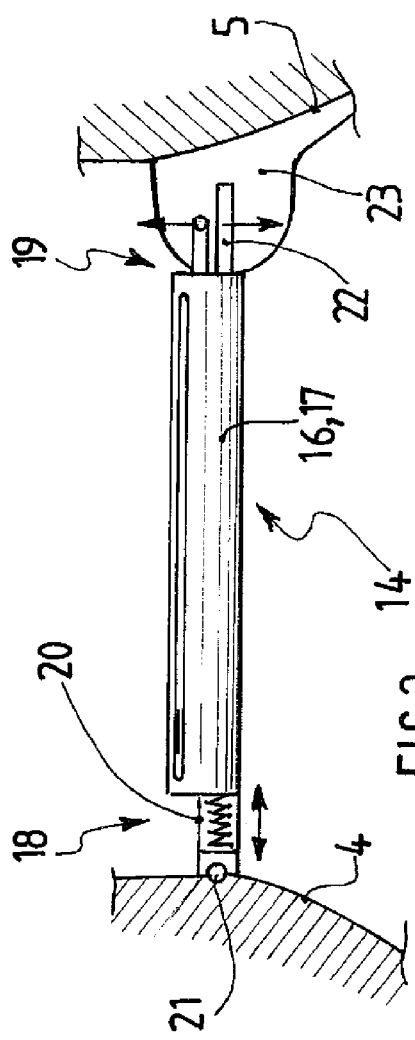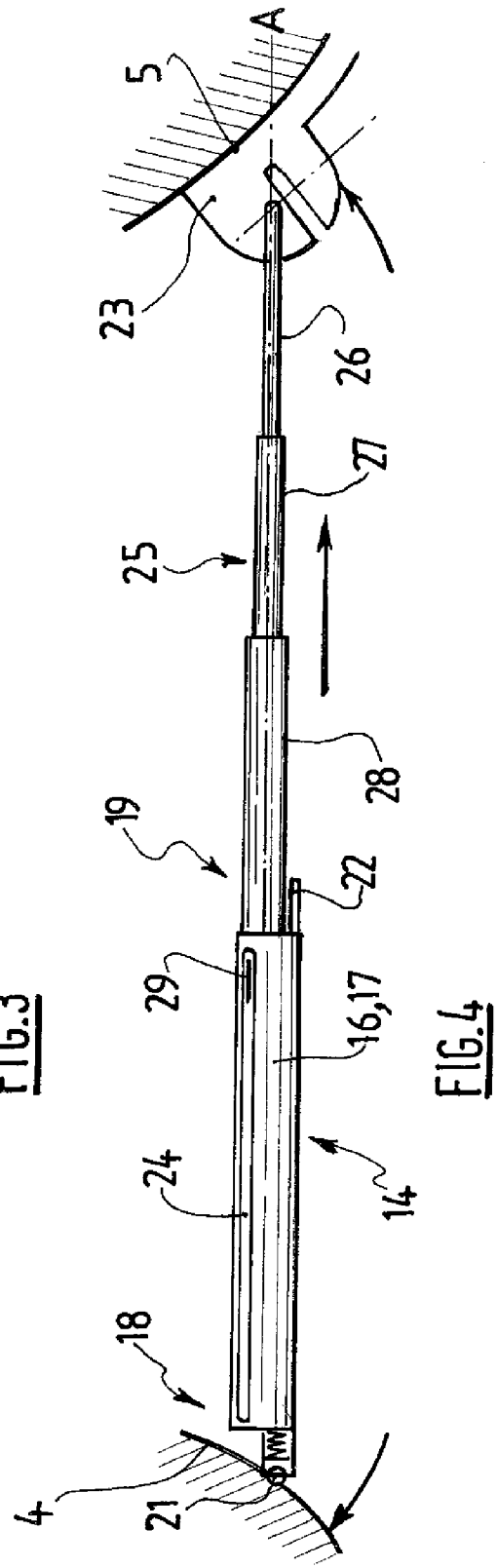

COUPLING DEVICE INTENDED TO CONNECT FIRST AND SECOND ELEMENTS WHICH CAN MOVE RELATIVE TO ONE ANOTHER

TECHNICAL FIELD

The invention relates to a coupling device intended for connecting a first and a second element which are movable in relation to one another.

BACKGROUND

A coupling device is used, in particular, in the field of aeronautics, especially in order to equip nacelles.

A nacelle is a fairing element making it possible to protect a jet engine of an aircraft. A nacelle comprises, in general, a front air inlet section, a middle section intended for surrounding a blower of the turbojet engine, and a rear section formed from at least one first and one second half-shell which are mounted movably in rotation on a mast so as each to be capable of being deployed between an operating position and a maintenance position.

Locking devices are arranged in the region of junction zones between the two articulated elements, said junction zones being arranged in the lower part, that is to say at 6 o'clock, and in the upper part, that is to say at 12 o'clock, in order to prevent the nacelle from opening during flight.

In the upper part of the nacelle, the mast is arranged between the two half-shells so that it is sometimes necessary to provide a coupling device making it possible to connect the two half-shells in spite of their spacing. In general terms, the coupling elements make it possible to transfer tensile forces from one half-shell to another, the transfer of compressive forces being ensured by means of dedicated compression rods called "bumper rods".

Thus, a conventional coupling device comprises a rod connected to the first and to the second half-shell respectively in the region of a first end and of a second end, at least one of the ends of the rod comprising a head intended for cooperating with locking means of the corresponding half-shell, so as to effect the removable fastening of the rod to the corresponding movable element.

It is then possible to separate the rod from at least one of the two half-shells in order to make it possible to space these apart during maintenance operations.

This type of coupling device has the disadvantages set out below.

Once the rod is detached from the corresponding half-shell, the latter falls under the effect of gravity.

A repositioning ramp system is generally provided, in order to allow the re-engagement of said rod with respect to the corresponding half-shell during the closing of the nacelle, so that the head of the rod cooperates with the locking means. The repositioning ramp system is installed, in particular, in the region of the jet engine.

A system of this type does not make it possible to ensure the repositioning of the rod in a reliable way. Moreover, it presents problems of bulk and of interface management between the nacelle itself and the jet engine. Another disadvantage is due to the introduction of interfering forces arising from the vibration or thermal expansion attributable to the jet engine.

BRIEF SUMMARY

The invention is aimed at overcoming all or some of these disadvantages by proposing a coupling device of small overall size, allowing a reliable re-engagement of the rod with respect to the corresponding half-shell, without contact or interference with the jet engine.

To achieve this, the invention concerns a coupling device intended for connecting a first and a second element movable in relation to one another, comprising a rod connected to the first and to the second movable element respectively in the region of a first and of a second end, at least one of the ends of the rod comprising a head intended for cooperating with locking means of the corresponding movable element, so as to effect the removable fastening of the rod to the corresponding movable element, characterized in that the coupling device comprises at least one telescopic guide member serving for supporting and for guiding the rod during the displacement of the movable elements, comprising a first and a second end intended to be attached respectively to a first and a second supporting element.

Thus, within the specific, but not exhaustive, scope of the use of the coupling device according to the invention for a nacelle, the coupling device makes it possible to support the rod after the disengagement of the head with respect to the locking means.

In this way, even after the two movable elements are spaced apart, namely the two half-shells in the abovementioned specific case of a nacelle, the rod returns to its original position after the bringing together of the two movable elements, so that the head can once again engage into the locking means.

According to a first embodiment of the invention, the telescopic guide member is displaceable between an extended position and a retracted position, the rod having a receptacle extending along its axis and making it possible to accommodate the guide member in the retracted position of the latter.

This characteristic makes it possible to increase the compactness of the coupling device. Another advantage is to reduce the number and/or complexity of the re-engagement devices and therefore to make re-engagement more reliable, while at the same time reducing the mass.

Advantageously, the head is arranged in the region of the second end of the rod, the second end of the telescopic guide member being intended to be attached to the second movable element, the first end of the telescopic guide member being mounted slidably on the rod.

According to one characteristic of the invention, the first end of the telescopic guide member has at least one finger inserted in at least one groove or at least one oblong aperture formed in the rod.

The slide of the finger within the oblong aperture allows the telescopic member to slide with respect to the rod.

Preferably, the first end of the rod comprises fastening means intended for fastening the rod to the first movable element, forming elastic means during the compression of the rod or during the tension of the rod, and forming a force transfer stop during the tension of the rod or during the compression of the rod.

The abovementioned fastening means make it possible to prevent the rod from being subjected to high compressive stresses, the transfer of compressive forces being ensured by the compression rods or "bumper rods".

According to a second embodiment of the invention, the first end of the telescopic guide member is intended to be attached to the first movable element, the telescopic guide member comprising an arm which, intended to be attached to a mast, is articulated on the second end of the telescopic guide member.

This embodiment makes it possible, particularly with regard to a nacelle fastened to a mast, to be able to open the nacelle at a considerable angle, without being impeded by the mast. To be precise, should the coupling member be fastened to each of the two half-shells, it may be necessary to limit the opening angle so as to prevent the coupling member from coming into abutment against the mast.

According to one characteristic of the invention, the telescopic guide member comprises a plurality of tubular elements sliding with respect to one another between an extended position and a retracted position of the telescopic guide member, the rod being accommodated in the tubular elements.

This characteristic makes it possible to improve the compactness of the coupling device.

Advantageously, the head of the rod is rounded and is intended to be engaged in the locking means.

The rounded head makes it possible to compensate possible errors in the position of the head with respect to the corresponding locking means during the closing of the nacelle. The rounded head thus makes it possible to guide the relevant end of the rod during its engagement in the abovementioned locking means.

The invention relates, furthermore, to a turbojet engine nacelle comprising a front air inlet section, a middle section intended for surrounding a blower of the turbojet engine, and a rear section formed from at least one first and one second half-shell which are mounted movably in rotation on a mast so as each to be capable of being deployed between an operating position, in which the half-shells are close to one another, and a maintenance position, in which the half-shells are spaced apart from one another, characterized in that the rear section is equipped with at least one coupling device according to the invention, the telescopic guide member being attached to the second half-shell in the region of its second end, the first end of the rod being attached to the first half-shell.

According to an alternative embodiment, the invention also relates to a turbojet engine nacelle comprising a front air inlet section, a middle section intended for surrounding a blower of the turbojet engine, and a rear section formed from at least one first and one second half-shell which are mounted movably in terms of rotation on a mast so as each to be capable of being deployed between an operating position, in which the half-shells are close to one another, and a maintenance position, in which the half-shells are spaced apart from one another, characterized in that the rear section is equipped with at least one coupling device according to the invention, the first end of the rod being attached to the first half-shell, the second end of the telescopic guide member being intended to be attached to the mast.

According to a characteristic of the invention which relates to the abovementioned variant, the locking means equip the second half-shell and cooperate with the head of the rod in the operating position of the nacelle, the second end of the telescopic guide member being arranged opposite the locking means in the maintenance position of the nacelle.

Furthermore, the invention relates to an aircraft, characterized in that it comprises at least one nacelle according to the invention.

BRIEF DESCRIPTION OF THE INVENTION

In any event, the invention will be understood clearly from the following description, with reference to the accompanying diagrammatic drawing which illustrates by way of example several embodiments of this coupling device and in which:

FIG. 2 is an exploded view of the nacelle in perspective and in a front view;

FIG. 3 is a view of a first embodiment of the coupling device in a closed position of the nacelle;

FIG. 4 is a view, corresponding to FIG. 3, in the open position of the nacelle;

DETAILED DESCRIPTION

Figure 1:
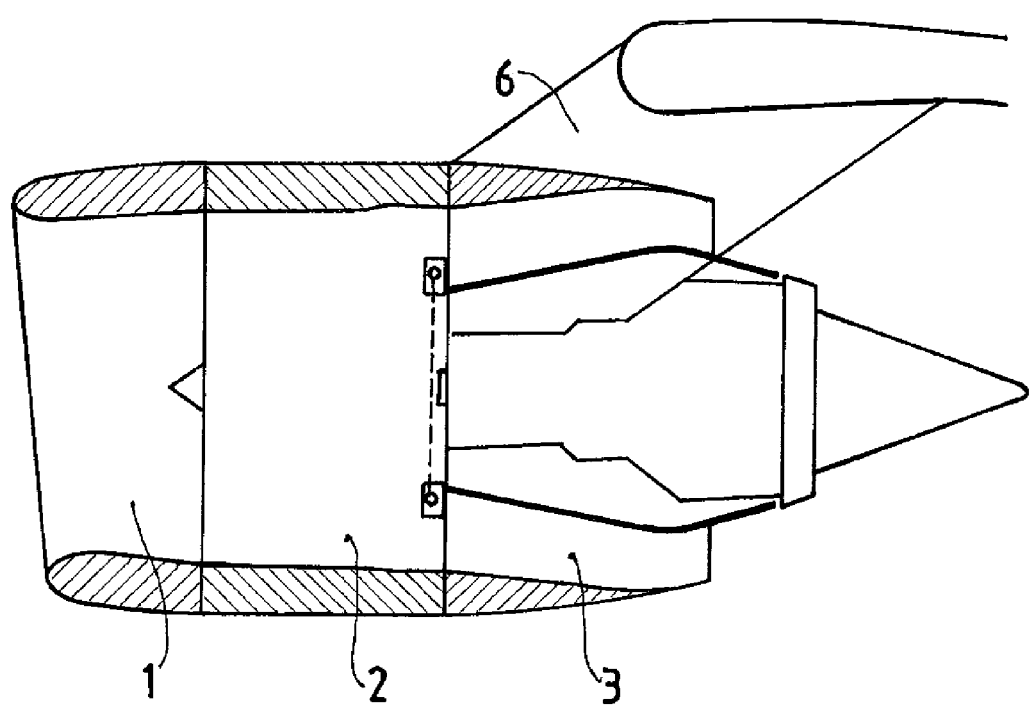
FIG. 1 is a diagrammatic view of a nacelle in longitudinal section.

FIGS. 1 and 2 illustrate the general structure of a turbojet engine nacelle according to the invention. The latter comprises a front air inlet section 1, a middle section 2 intended for surrounding a blower of the turbojet engine, and a rear section 3 formed from at least one first and one second half-shell 4, 5 which are mounted movably in rotation on a mast 6 of an aircraft, so as each to be capable of being deployed between an operating position and a maintenance position.

Each half-shell 4, 5 has the general form of a hollow semi-cylinder delimiting two junction zones with the half-shell facing it, namely an upper junction zone 7 and a lower junction zone 8.

The lower and upper positions are also called respectively 6 o'clock and 12 o'clock positions.

The nacelle is equipped with a first and a second locking device 9, 10. It should be noted that, for the sake of clarity, only two of these devices are illustrated.

Each locking device 9, 10 comprises a first locking system 11 and a second locking system 12.

The first locking systems 11 are mounted on the second half-shell 5 and are capable of being locked on corresponding retaining members 13 mounted on the first half-shell 4.

The second locking systems 12 are mounted on the second half-shell 5 and cooperate respectively with a first and a second coupling device 14, 15 which are mounted on the first half-shell 4 in the region of the upper junction zone 7.

Figure 6:
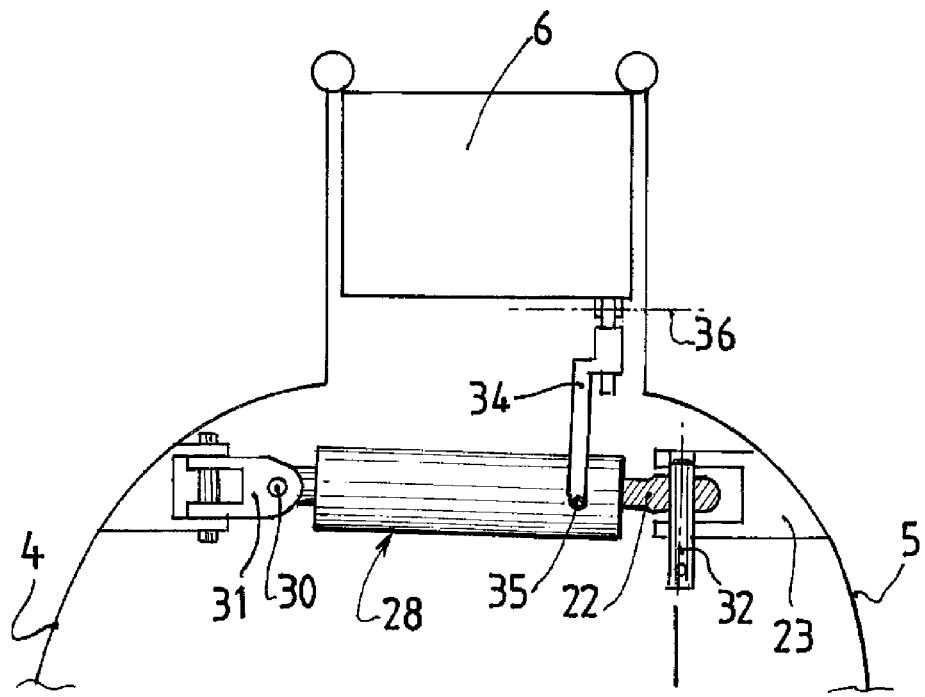
FIG. 6 is a diagrammatic view of part of the nacelle in the closed position, the nacelle being equipped with the abovementioned coupling device.

The coupling devices 14, 15 make it possible to connect the two half-shells 4, 5 in spite of the presence of the mast 6 between them in the region of their upper junction zone 7, as illustrated particularly in FIG. 6.

More particular attention will be given to the structure and functioning of the first and second coupling devices 14, 15.

FIGS. 3 and 4 illustrate a first embodiment of the coupling device according to the invention, corresponding to the first coupling device 14 of which the position on the nacelle is illustrated in FIG. 2.

The first coupling device 14 comprises a rod 16 comprising a body 17 which comprises a first and a second end 18, 19 connected respectively to the first and to the second half-shell 4, 5.

The first end 18 of the body is equipped with fastening means 20 intended for fastening the rod 16 to the first movable element 4, forming elastic means during the tension of the rod 16 and forming a stop allowing the transfer of force during the compression of the rod 16. The fastening means 20 are themselves equipped with means 21 of articulation on the first half-shell 4.

According to another possibility of the invention, the fastening means 20 form elastic means during the compression of the rod 16 and form a stop allowing the transfer of force during the tension of the rod 16.

The second end 19 of the body 17 is equipped with a head 22 in the form of a sheet bar, intended for cooperating with locking means 23 of the second half-shell 5. The structure of the locking means 23 is known to persons skilled in the art and will not be described in detail below.

The rod 16 is thus fastened removably to the second half-shell 5 and is articulated on the first half-shell 4.

The body 17 of the rod 16 has the general form of a U, so as to delimit two flanks connected by a base, each flank being equipped with an oblong aperture 24 extending along the axis A of the body 17.

The rod 16 comprises, furthermore, a telescopic guide member 25 serving for supporting and for guiding the rod 16 during the displacement of the half-shells 4, 5.

The telescopic guide member 25 comprises a first, a second and a third tubular element 26, 27, 28 mounted displaceably one inside the other between a retracted position of the guide member 25, illustrated in FIG. 3, and an extended position of the latter, illustrated in FIG. 4.

The telescopic guide member 25 permanently connects the rod 16 to the second half-shell 5. More specifically, the first tubular element 26 is mounted in an articulated manner on the second half-shell 5 in the region of one end of the latter. Furthermore, the third tubular element 28 is accommodated, at least partially, in a receptacle of the rod 16, which receptacle is delimited by the interior of the U, and comprises two fingers 29 respectively in each of the engaged oblong apertures 24 of the body 17 of the rod 16. The third tubular element 28 is thus mounted slidably on the rod 16.

In the closed position of the nacelle, that is to say in the position where the half-shells 4, 5 are close together, the head 22 of the rod 16 is engaged in the locking means 23, the rod 16 then ensuring the transfer of tensile forces from one half-shell to another.

During the opening of the nacelle, particularly during maintenance operations, the locking means 23 are unlocked, and the two half-shells 4, 5 are spaced apart with respect to one another.

In this case, the telescopic guide member 25 is extended, and the third element 28 of the latter slides with respect to the rod 16 by means of the fingers 29.

During the reclosing of the nacelle, the two half-shells 4, 5 are once again brought together and the telescopic guide member 25 is retracted, so that the head 22 is progressively returned opposite the locking means 23 so as to ensure a good engagement of the head 22 with respect to these.

Conventionally, the locking means 23 comprise a bolt, not illustrated in the drawing, which is displaceable in translational motion, the telescopic guide member 25 being attached to the locking means 23 in line with the bolt, thus making it possible to ensure the proper re-engagement of the locking finger 22 in the locking means.

Simultaneously, the third tubular element 28 of the guide member 25 is inserted progressively into the rod 16. Likewise, the second and first tubular elements 26, 27 are inserted respectively into the third and into the second tubular element 27, 28, so that the coupling device 14 resumes its original position illustrated in FIG. 3.

FIGS. 5 to 9 illustrate a second embodiment of the coupling device according to the invention, corresponding to the second coupling device 15, of which the position on the nacelle is illustrated in FIG. 2.

To make understanding easier, some of the elements described above with reference to the first embodiment are designated by the same reference numerals.

Figure 5:
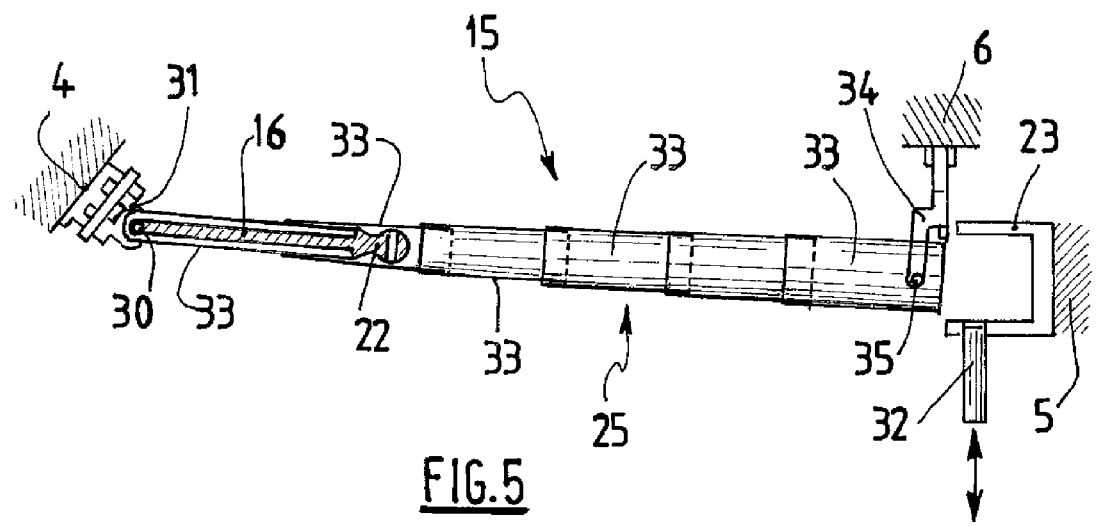
FIG. 5 is a view in longitudinal section of a second embodiment of the coupling device in the deployed position of the first half-shell.

The structure of the coupling device 15 according to this second embodiment is illustrated more particularly in FIG. 5.

The rod 16 is mounted in an articulated manner on the first half-shell 4 by means of a pivot pin 30 and an articulated yoke 31. The articulation of the rod 16 thus obtained allows rotations according to two perpendicular pivot axes. The head 22 of the rod 16, said head being arranged in the region of its second end 19, has a rounded form and comprises a hole intended for cooperating with a bolt 32 of the locking means 23 equipping the second half-shell 5.

The telescopic guide member 25 is formed by the sequence of five tubular elements 33 mounted slidably one in the other, the rod 16 being accommodated in the guide member 25. The latter is mounted slidably on the rod 16 in the region of a first end and is equipped with a holding arm 34 in the region of a second end.

According to another embodiment, not illustrated, the guide member 25 is mounted in an articulated manner on the pivot pin 30 in the region of a first end and is equipped with a holding arm 34 in the region of a second end.

The holding arm 34 comprises a fork mounted pivotably in the region of its free ends on the telescopic guide member 25 about a pivot axis 35. The base of the fork is fastened to the mast 6 by means of an axis of articulation 36 perpendicular to the pivot axis 35 of the fork. The fork comprises two parts movable in translational movement with respect to one another, so as to allow a vertical displacement of the corresponding end of the telescopic guide member 25.

The articulation of the arm 34 makes it possible to facilitate the re-engagement of the head 22 of the rod 16 in the locking means 23, to dispense with positioning deviations between the two half-shells 4 and 5 and to permit relative displacement between the two half-shells 4 and 5 during flight.

FIG. 6 illustrates diagrammatically the nacelle in a closed position and equipped with the abovementioned coupling device.

In the closed position of the nacelle, the head 22 of the rod 16 is inserted in the locking means 23 so that the bolt 32 can be introduced into the hole of the head 22 so as to effect the locking of the nacelle.

During the opening of the nacelle, the bolt 32 is disengaged from the head 22 and the first half-shell 4 is spaced apart from the second 5. The telescopic guide member 25 is then extended and the head 22 is accommodated completely in the latter. During the extension of the telescopic guide member 25, the latter pivots about the axis 35 and slides along the rod 16, itself articulated about the axis 30.

During the reclosing of the nacelle, the first half-shell 4 is once again brought together with the second 5, so that the head 22 of the rod 16 is brought progressively opposite the locking means 23.

The engagement of the head 22 in the locking means 23 is thus ensured reliably. Furthermore, the rounded form of the head 22 contributes to the reliability of this introduction with the aid of engagement means equipping the locking means 23.

Figure 7:
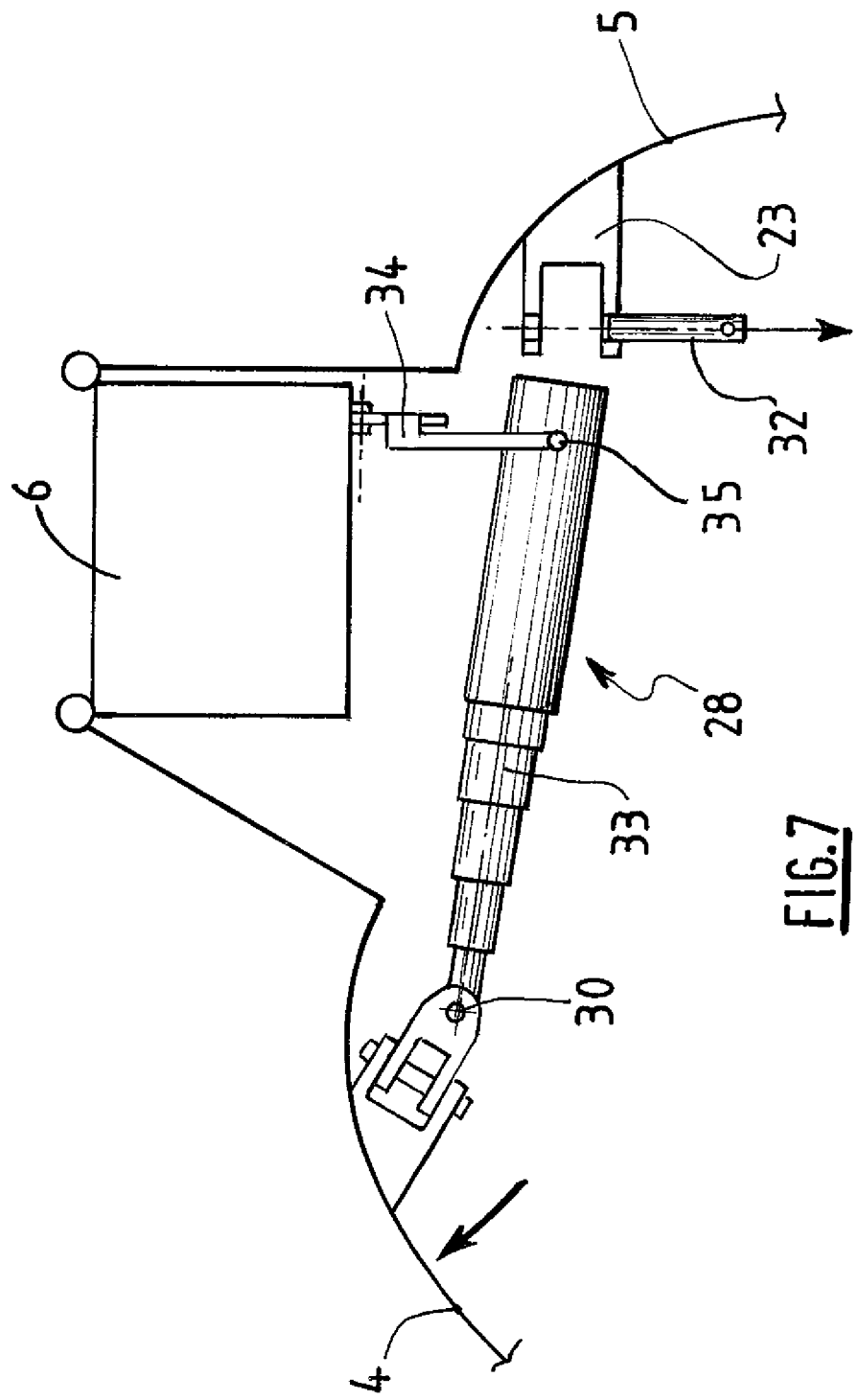
FIG. 7 is a view, corresponding to FIG. 6, only one first half-shell being open.
Figure 8:
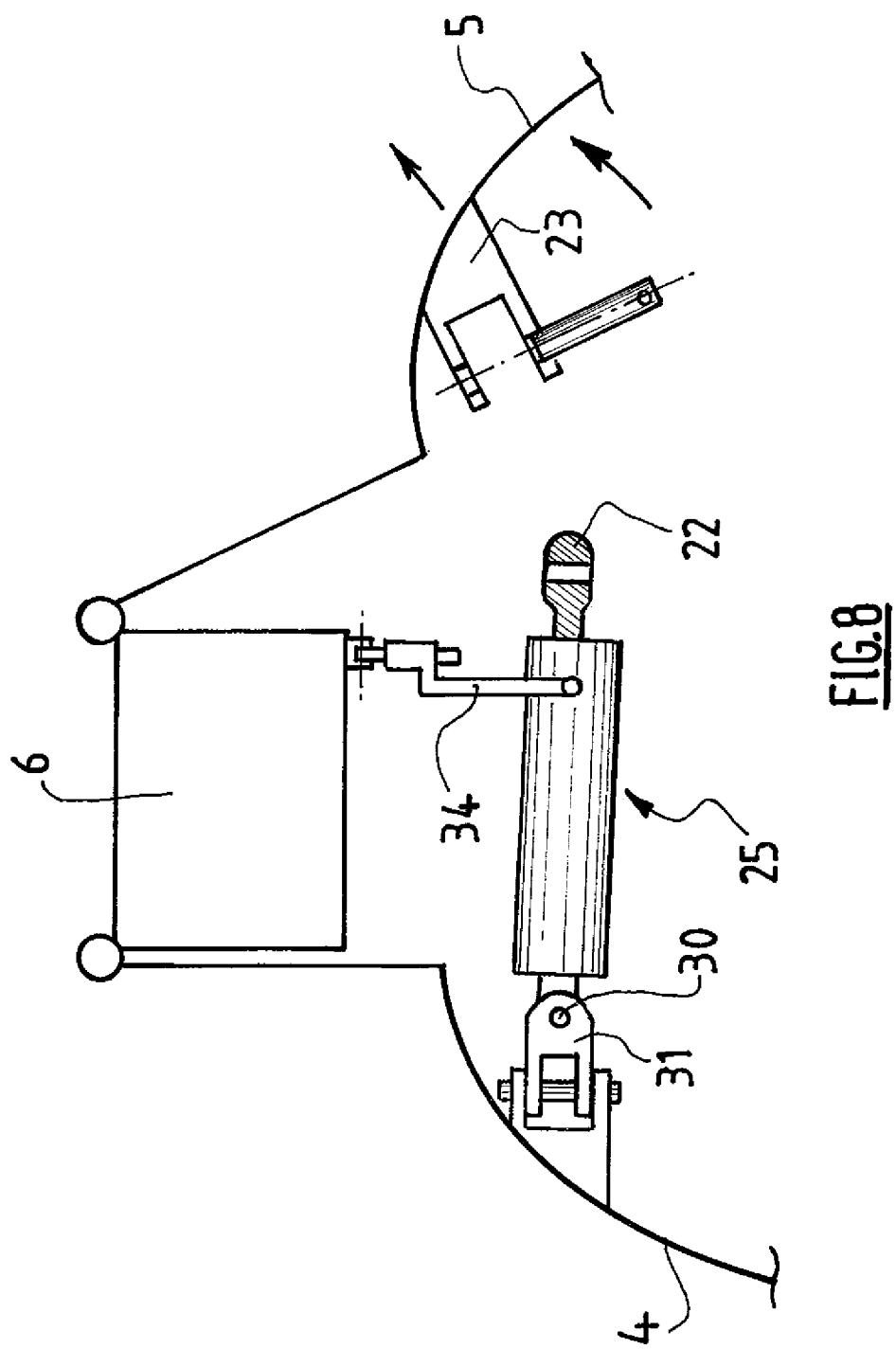
FIG. 8 is a view, corresponding to FIG. 6, only one second half-shell being open.
Figure 9:
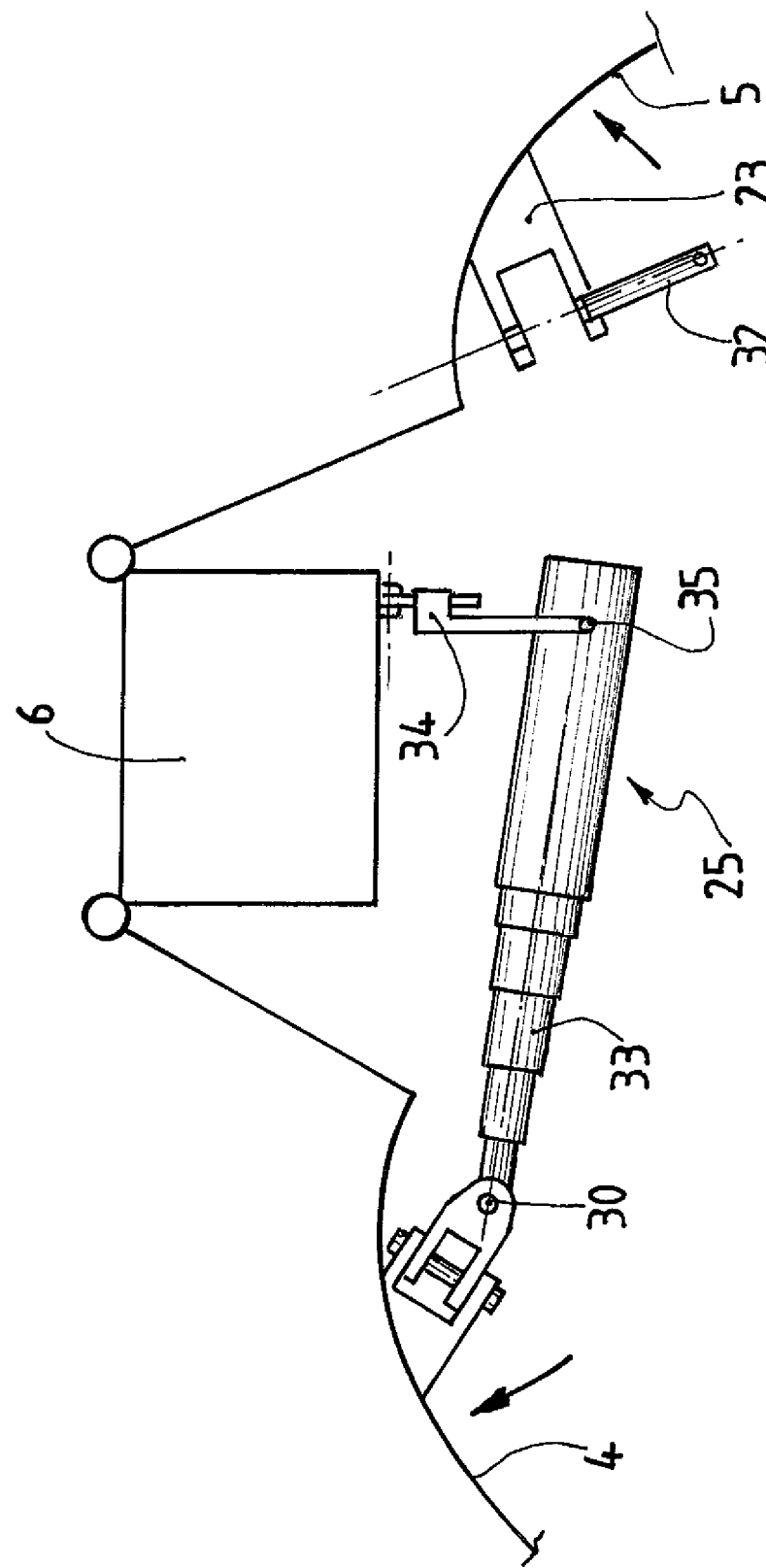
FIG. 9 is a view, corresponding to FIG. 6, the two half-shells being open.

FIG. 7 illustrates the opening of the nacelle as a result of the opening of the first half-shell 4 only. It is likewise possible to open the nacelle by means of the opening of the second half-shell 5 only or by means of the opening of the two half-shells 4, 5 as illustrated respectively in FIGS. 8 and 9.

It will be appreciated that the invention is not limited only to the embodiments of this coupling device which are described above by way of example, but on the contrary, embraces all the variants.

The invention claimed is:

1. A coupling device intended for connecting a first and a second element movable in relation to one another, comprising:
   a rod connected to the first and to the second movable element respectively in a region of a first and of a second end, at least one of the ends of the rod comprising a head cooperating with locking means of the corresponding movable element, so as to effect a removable fastening of the rod to the corresponding movable element, and
   at least one telescopic guide member serving for supporting and for guiding the rod during displacement of the movable elements, comprising a first and a second end attached respectively to a first and a second supporting element, wherein the first end of the telescopic guide member is attached to the first movable element, the telescopic guide member comprising an arm being attached to a mast and articulated on the second end of the telescopic guide member.

2. The coupling device as claimed in claim 1, wherein the telescopic guide member is displaceable between an extended position and a retracted position, the rod having a receptacle extending along its axis and making it possible to accommodate the guide member in the retracted position of the latter.

3. The device as claimed in claim 1, wherein the head is arranged in the region of the second end of the rod, the second end of the telescopic guide member being intended to be attached to the second movable element, the first end of the telescopic guide member being mounted slidably on the rod.

4. The device as claimed in claim 3, wherein the first end of the telescopic guide member has at least one finger inserted in at least one groove or at least one oblong aperture formed in the rod.

5. The device as claimed in claim 3, wherein the first end of the rod comprises fastening means intended for fastening the rod to the first movable element, forming elastic means during compression of the rod or during tension of the rod, and forming a force transfer stop during the tension of the rod or during the compression of the rod.

6. The device as claimed in claim 1, wherein the telescopic guide member comprises a plurality of tubular elements sliding with respect to one another between an extended position and a retracted position of the telescopic guide member, the rod being accommodated in the tubular elements.

7. The device as claimed in claim 1, wherein the head of the rod is rounded and engaged in the locking means.

8. A turbojet engine nacelle comprising:
   a front air inlet section,
   a middle section intended for surrounding a blower of the turbojet engine, and
   a rear section formed from at least one first and one second half-shell which are mounted movably in rotation on a mast, so as each to be capable of being deployed between an operating position, in which the half-shells are close to one another, and a maintenance position, in which the half-shells are spaced apart from one another,
   wherein the rear section is equipped with at least one coupling device as claimed in claim 1, the telescopic guide member being attached to the second half-shell in the region of its second end, the first end of the rod being attached to the first half-shell.

9. A turbojet engine nacelle comprising:
   a front air inlet section,
   a middle section intended for surrounding a blower of the turbojet engine, and
   a rear section formed from at least one first and one second half-shell which are mounted movably in terms of rotation on a mast, so as each to be capable of being deployed between an operating position, in which the half-shells are close to one another, and a maintenance position, in which the half-shells are spaced apart from one another,
   wherein the rear section is equipped with at least one coupling device as claimed in claim 1, the first end of the telescopic guide member being attached to the first half-shell, the second end of the telescopic guide member being intended to be attached to the mast.

10. The nacelle as claimed in claim 9, wherein the locking means equip the second half-shell and cooperate with the head of the rod in the operating position of the nacelle, the second end of the telescopic guide member being arranged opposite the locking means in the maintenance position of the nacelle.

11. An aircraft, comprising at least one nacelle as claimed in claim 9.

* * * * *